US009366189B2

(12) United States Patent
Hong et al.

(10) Patent No.: US 9,366,189 B2
(45) Date of Patent: Jun. 14, 2016

(54) SYSTEM AND METHOD FOR REDUCING PRESSURE OSCILLATIONS WITHIN A GAS TURBINE ENGINE (75) Inventors: Zekai Hong, Altamont, NY (US); Joel Meier Haynes, Schenectady, NY (US); Keith Robert McManus, Clifton Park, NY (US); John Thomas Herbon, Loveland, OH (US)

(73) Assignee: General Electric Company, Niskayuna, NY (US)

( * ) Notice: Subject to any disclaimer, the term of this patent is extended or adjusted under 35 U.S.C. 154(b) by 982 days.

(21) Appl. No.: 13/538,836

(22) Filed: Jun. 29, 2012

(65) Prior Publication Data

US 2014/0007584 A1    Jan. 9, 2014

(51) Int. Cl.
*F02C 9/26* (2006.01)
*F02C 7/232* (2006.01)

(52) U.S. Cl.
CPC . *F02C 7/232* (2013.01); *F02C 9/26* (2013.01); *F05D 2270/14* (2013.01); *F23R 2900/00013* (2013.01)

(58) Field of Classification Search
CPC ........ F02C 9/26; F02C 7/232; F05D 2270/14; F23R 2900/00013
See application file for complete search history.

(56) References Cited

U.S. PATENT DOCUMENTS

| 5,706,643 | A  | * | 1/1998  | Snyder et al. .................... 60/776 |
| 5,791,889 | A  | * | 8/1998  | Gemmen et al. .................. 431/1 |
| 6,257,205 | B1 |   | 7/2001  | Calvas et al. |
| 6,398,547 | B1 | * | 6/2002  | Joshi et al. ....................... 432/54 |
| 6,775,986 | B2 | * | 8/2004  | Ganz et al. ....................... 60/773 |
| 6,843,061 | B2 |   | 1/2005  | Parker et al. |
| 7,665,305 | B2 | * | 2/2010  | Cornwell et al. ............... 60/740 |
| 7,775,052 | B2 | * | 8/2010  | Cornwell et al. ............... 60/803 |
| 7,831,372 | B2 |   | 11/2010 | Sawut et al. |
| 7,966,801 | B2 |   | 6/2011  | Umeh et al. |
| 7,966,834 | B2 |   | 6/2011  | Myhre |
| 8,028,512 | B2 |   | 10/2011 | Mendoza et al. |
| 8,108,123 | B2 |   | 1/2012  | Sarlashkar et al. |
| 2006/0177785 | A1 | * | 8/2006 | Varagani et al. ................. 431/12 |
| 2009/0077945 | A1 |   | 3/2009  | Cornwell et al. |

* cited by examiner

*Primary Examiner* — Carlos A Rivera
(74) *Attorney, Agent, or Firm* — Pabrita K. Chakrabarti (57) ABSTRACT In one embodiment, a system for reducing pressure oscillations within a gas turbine engine includes at least one fuel injector configured to inject fuel into a combustor. The system also includes a valve fluidly coupled to the at least one fuel injector. The system further includes a controller communicatively coupled to the valve. The controller is configured to cycle the valve between an open position and a closed position at a first frequency and a first duty cycle while a magnitude of pressure oscillations within the combustor is less than a threshold value, to cycle the valve between the open position and the closed position at a second frequency and a second duty cycle while the magnitude of the pressure oscillations within the combustor is greater than or equal to the threshold value, and to adjust the second frequency based on a measured frequency of the pressure oscillations.

17 Claims, 6 Drawing Sheets

SYSTEM AND METHOD FOR REDUCING PRESSURE OSCILLATIONS WITHIN A GAS TURBINE ENGINE

STATEMENT REGARDING FEDERALLY SPONSORED RESEARCH & DEVELOPMENT

This invention was made with Government support under contract number NNC10CA10C awarded by the National Aeronautics and Space Administration. The Government has certain rights in the invention.

BACKGROUND

The subject matter disclosed herein relates to a system and method for reducing pressure oscillations within a gas turbine engine.

In general, gas turbine engines combust a mixture of compressed air and fuel to produce hot combustion gases. Combustion may occur in multiple combustors positioned radially around the longitudinal axis of the gas turbine engine. Air and fuel pressures within each combustor may vary cyclically with time. These fluctuations may drive combustor pressure oscillations at various frequencies. The pressure oscillations may propagate downstream to a turbine and/or upstream to a compressor, thereby interfering with gas flow through various turbine components. For example, pressure oscillations within the compressor may decrease compressor efficiency and/or induce compressor stall.

BRIEF DESCRIPTION

In one embodiment, a system for reducing pressure oscillations within a gas turbine engine includes at least one fuel injector configured to inject fuel into a combustor. The system also includes a valve fluidly coupled to the at least one fuel injector. The valve is configured to facilitate fuel flow to the at least one fuel injector while the valve is in an open position, and to block fuel flow to the at least one fuel injector while the valve is in a closed position. The system further includes a controller communicatively coupled to the valve. The controller is configured to cycle the valve between the open position and the closed position at a first frequency and a first duty cycle while a magnitude of pressure oscillations within the combustor is less than a threshold value, to cycle the valve between the open position and the closed position at a second frequency and a second duty cycle while the magnitude of the pressure oscillations within the combustor is greater than or equal to the threshold value, and to adjust the second frequency based on a measured frequency of the pressure oscillations.

In another embodiment, a system for reducing pressure oscillations within a gas turbine engine includes a controller configured to send a first signal to at least one valve that instructs the at least one valve to cycle between an open position that facilitates fuel flow to a combustor and a closed position that blocks fuel flow to the combustor at a first frequency and a first duty cycle. The controller is also configured to receive feedback signals indicative of a magnitude, a phase, and a frequency of pressure oscillations within the combustor. The controller is further configured to send a second signal to the at least one valve that instructs the at least one valve to cycle between the open position and the closed position at a second frequency and a second duty cycle while the magnitude of the pressure oscillations within the combustor is greater than or equal to a threshold value. In addition, the controller is configured to adjust the second frequency such that the second frequency is substantially equal to the frequency of the pressure oscillations within the combustor.

In a further embodiment, a method for reducing pressure oscillations within a gas turbine engine includes sending a first signal to a valve that instructs the valve to cycle between an open position and a closed position at a first frequency and a first duty cycle. The valve is configured to facilitate fuel flow to a combustor while the valve is in the open position, and to block fuel flow to the combustor while the valve is in the closed position. The method also includes receiving feedback signals from a pressure sensor indicative of a magnitude, a phase, and a frequency of pressure oscillations within the combustor. The method further includes sending a second signal to the valve that instructs the valve to cycle between the open position and the closed position at a second frequency and a second duty cycle while the magnitude of the pressure oscillations within the combustor is greater than or equal to a threshold value. The second frequency is substantially equal to the frequency of the pressure oscillations within the combustor.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments disclosed herein, the articles "a," "an," "the," and "said" are intended to mean that there are one or more of the elements. The terms "comprising," "including," and "having" are intended to be inclusive and mean that there may be additional elements other than the listed elements.

Embodiments disclosed herein substantially reduce pressure oscillations within a gas turbine system. In certain embodiments, the gas turbine system includes a pressure oscillation reduction system having a fuel injector configured to inject fuel into a combustor. The pressure oscillation reduction system also includes a valve fluidly coupled to the fuel injector. The valve is configured to facilitate fuel flow to the fuel injector while the valve is in an open position, and to block fuel flow to the fuel injector while the valve is in a closed position. The pressure oscillation reduction system further includes a controller communicatively coupled to the valve. The controller is configured to cycle the valve between the open position and the closed position at a first frequency and a first duty cycle while a magnitude of pressure oscillations within the combustor is less than a threshold value. The first frequency and the first duty cycle are configured to provide a desired fuel flow to the combustor (e.g., based on a throttle setting). The controller is also configured to cycle the valve between the open position and the closed position at a second frequency and a second duty cycle while the magnitude of the pressure oscillations within the combustor is greater than or equal to the threshold value. The second frequency and/or the second duty cycle may be particularly selected and/or adjusted to uncouple heat of release pressure oscillations from combustor pressure oscillations, thereby reducing the magnitude of the pressure oscillations within the combustor, and throughout the gas turbine system.

Figure 1:
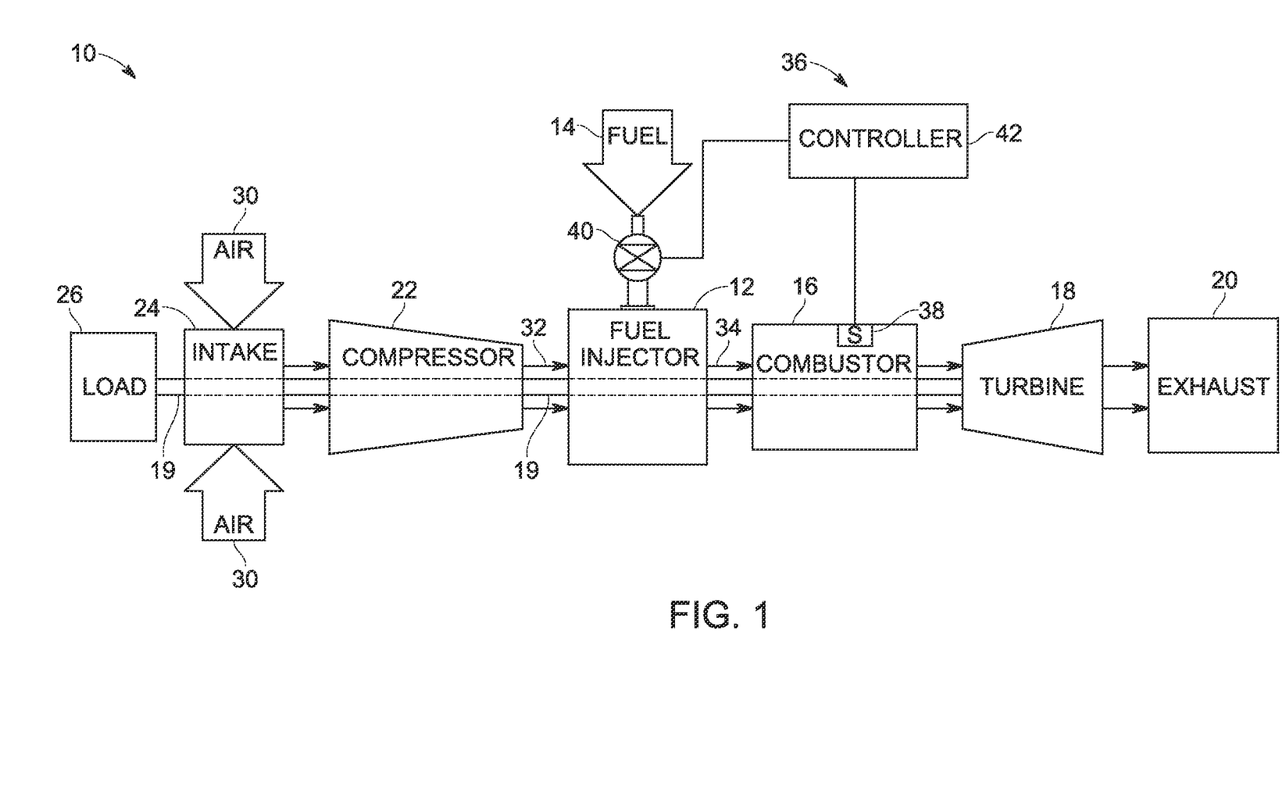
FIG. 1 is a block diagram of an embodiment of a turbine system including a pressure oscillation reduction system configured to reduce combustor driven pressure oscillations within the gas turbine system.

FIG. 1 is a block diagram of an embodiment of a turbine system 10 including a pressure oscillation reduction system configured to reduce combustor driven pressure oscillations within the gas turbine system. The turbine system 10 includes a fuel injector 12, a fuel supply 14, and a combustor 16. As illustrated, the fuel supply 14 routes a liquid fuel and/or gas fuel, such as natural gas, to the gas turbine system 10 through the fuel injector 12 into the combustor 16. As discussed below, the fuel injector 12 is configured to inject and mix the fuel with compressed air. The combustor 16 ignites and combusts the fuel-air mixture, and then passes hot pressurized exhaust gas into a turbine 18. As will be appreciated, the turbine 18 includes one or more stators having fixed vanes or blades, and one or more rotors having blades which rotate relative to the stators. The exhaust gas passes through the turbine rotor blades, thereby driving the turbine rotor to rotate. Coupling between the turbine rotor and a shaft 19 causes the rotation of the shaft 19, which is also coupled to several components throughout the gas turbine system 10, as illustrated. Eventually, the exhaust of the combustion process may exit the gas turbine system 10 via an exhaust outlet 20.

A compressor 22 includes blades rigidly mounted to a rotor which is driven to rotate by the shaft 19. As air passes through the rotating blades, air pressure increases, thereby providing the combustor 16 with sufficient air for proper combustion. The compressor 22 may intake air to the gas turbine system 10 via an air intake 24. Further, the shaft 19 may be coupled to a load 26, which may be powered via rotation of the shaft 19. As will be appreciated, the load 26 may be any suitable device that may use the power of the rotational output of the gas turbine system 10, such as a power generation plant or an external mechanical load. For example, the load 26 may include an electrical generator, a propeller of an airplane, and so forth. The air intake 24 draws air 30 into the gas turbine system 10 via a suitable mechanism, such as a cold air intake. The air 30 then flows through blades of the compressor 22, which provides compressed air 32 to the combustor 16. In particular, the fuel injector 12 may inject the compressed air 32 and fuel 14, as a fuel-air mixture 34, into the combustor 16. Alternatively, the compressed air 32 and fuel 14 may be injected directly into the combustor for mixing and combustion.

As illustrated, the turbine system 10 includes a pressure oscillation reduction system 36 configured to reduce combustor driven pressure oscillations within the turbine system. As will be appreciated, flame shape oscillations, flame temperature oscillations, and/or fuel flow rate oscillations may establish "heat of release" pressure oscillations within the combustor 16. If the frequency of these pressure oscillations corresponds to a characteristic frequency (e.g., resonance frequency) of the combustor 16, the pressure oscillations may be amplified. Such large magnitude pressure oscillations may reduce turbine system efficiency, and/or decrease the longevity of the gas turbine system. Accordingly, the pressure oscillation reduction system 36 is configured to adjust the frequency, the duty cycle, and/or the phase of fuel pulses into the combustor, thereby uncoupling the heat of release pressure oscillations from the combustor pressure oscillations. As a result, the magnitude of the pressure oscillations within the combustor 16 may be significantly reduced.

In the illustrated embodiment, the pressure oscillation reduction system 36 includes a pressure sensor 38 configured to measure a frequency and a magnitude of pressure oscillations within the combustor 16. As will be appreciated, the pressure sensor 38 may be any suitable device for measuring pressure within the combustor 16. For example, the pressure sensor 38 may include a fiber optic sensor, a mechanical deflection sensor, a piezoelectric sensor, or a microelectromechanical systems (MEMS) sensor, among others. The pressure oscillation reduction system 36 also includes a valve 40 fluidly coupled to the fuel injector 12. The valve 40 is configured to facilitate fuel flow to the fuel injector 12 while the valve is in an open position, and to block fuel flow to the fuel injector 12 while the valve is in a closed position. The sensor 38 and the valve 40 are communicatively coupled to a controller 42, which is configured to cycle the valve 40 between the open position and the closed position to control fuel flow to the combustor 16. During normal operation, the controller 42 is configured to instruct the valve 40 to cycle at a first frequency and a first duty cycle to provide a desired fuel flow to the combustor 16. However, if the magnitude of the pressure oscillations within the combustor 16 exceeds a threshold value, the controller 42 may instruct the valve 40 to cycle at a second frequency and a second duty cycle to damp the pressure oscillations within the combustor. For example, the controller 42 may be configured to adjust the second frequency such that the second frequency is substantially equal to the frequency of the pressure oscillations within the combustor. The controller 42 may also cycle the valve 40 at a phase delay relative to a phase of the pressure oscillations. The phase delay may uncouple the heat of release pressure oscillations from the combustor pressure oscillations, thereby reducing the magnitude of the pressure oscillations within the gas turbine system 10.

Figure 2:
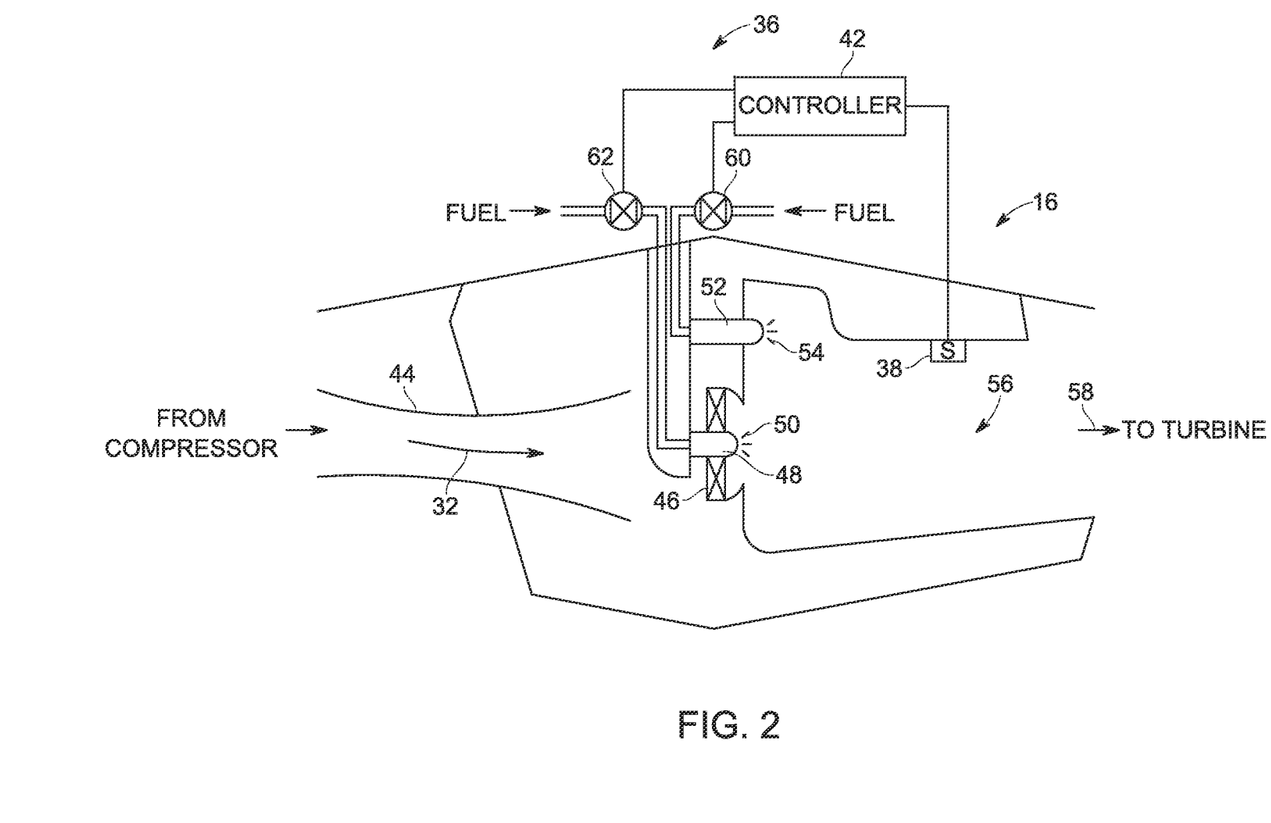
FIG. 2 is a schematic diagram of an embodiment of a pressure oscillation reduction system that may be employed within the gas turbine engine system of FIG. 1.

FIG. 2 is a schematic diagram of an embodiment of a pressure oscillation reduction system 36 that may be employed within the gas turbine engine system 10 of FIG. 1. In the illustrated embodiment, the pressure oscillation reduction system 36 is coupled to a combustor 16, which is configured to mix fuel and air to establish a suitable fuel-air mixture for combustion. As illustrated, compressed air 32 flows through a pneumatic path 44 into an interior of the combustor 16. The compressed air 32 then flows through swirler vanes 46 configured to establish a swirling air flow that enhances mixing between the fuel and the air. As illustrated, a main fuel injector 48 is positioned within a central region of the swirler vanes 46. The main fuel injector 48 is configured to spray fuel 50 into the swirling air flow to establish a fuel-air mixture. In the illustrated embodiment, the combustor 16 also includes a pilot fuel injector 52 configured to spray fuel 54 into the interior of the combustor 16. An igniter induces combustion of the fuel 54 from the pilot fuel injector 52, thereby establishing a pilot flame. The pilot flame, in turn, induces combustion of the fuel 50 from the main fuel injector 48 within a combustion zone 56 of the combustor 16, thereby generating pressurized exhaust gas 58 that drives the turbine to rotate.

In the illustrated embodiment, the controller 42 is communicatively coupled to a first valve 60, which is configured to control fuel flow to the pilot fuel injector 52. The controller 42 is also communicatively coupled to a second valve 62, which is configured to control fuel flow to the main fuel injector 48. In certain embodiments, the controller 42 is configured to cycle the second valve 62 between the open and closed positions to control fuel flow into the combustor 16 (e.g., for providing a desired thrust based on a throttle input). In addition, the controller 42 may be configured to cycle the first valve 60 between the open and closed positions to reduce pressure oscillations within the combustor 16. For example, the controller 42 may receive a feedback signal from the pressure sensor 38 indicative of a magnitude, a phase, and a frequency of pressure oscillations within the combustor 16. If the sensor 38 detects pressure oscillations having a magnitude greater than or equal to a threshold value, the controller 42 may send a signal to the first valve 60 that instructs the valve 60 to cycle between the open position and the closed position at a frequency substantially equal to the frequency of the pressure oscillations within the combustor 16. The controller 42 may also delay a phase of the signal relative to the phase of the pressure oscillations, thereby damping the pressure oscillations within the turbine system 10.

In further embodiments, the controller 42 may be configured to control fuel flow to the main fuel injector 48 to reduce pressure oscillations within the turbine system 10. For example, in certain embodiments, the controller 42 may be configured to send a first signal to the second valve 62 that instructs the second valve to cycle between the open and closed positions at a first frequency and a first duty cycle (e.g., to provide a desired fuel flow to the combustor based on a throttle setting). Upon detection of pressure oscillations having a magnitude greater than or equal to a threshold value, the controller 42 may send a second signal to the second valve 62 that instructs the second valve 62 to cycle at a second frequency and a second duty cycle (e.g., a frequency and duty cycle configured to reduce the magnitude of the pressure oscillations). In such embodiments, the controller may adjust the second frequency such that the second frequency is substantially equal to the frequency of the pressure oscillations within the combustor. The controller 42 may also delay a phase of the second signal relative to the phase of the pressure oscillations, thereby damping the pressure oscillations within the turbine system 10.

In alternative embodiments, the controller 42 may be configured to cycle both valves 60 and 62 at a frequency and a duty cycle that reduces pressure oscillations within the combustor 16. For example, if the pressure sensor 38 detects pressure oscillations having a magnitude greater than or equal to the threshold value, the controller 42 may send substantially the same signal to each valve, instructing the valves to cycle at a frequency and duty cycle that reduces the magnitude of the pressure oscillations within the combustor 16. In further embodiments, the controller 42 may be configured to send different signals to the first valve 60 and to the second valve 62. Each signal may have a different frequency, duty cycle, and/or phase delay. In such embodiments, various fuel pressure frequencies may be established throughout the combustor 16, thereby further uncoupling the heat of release pressure oscillations from the combustor pressure oscillations. As a result, the magnitude of the pressure oscillations within the combustor 16 may be further reduced.

Figure 3:
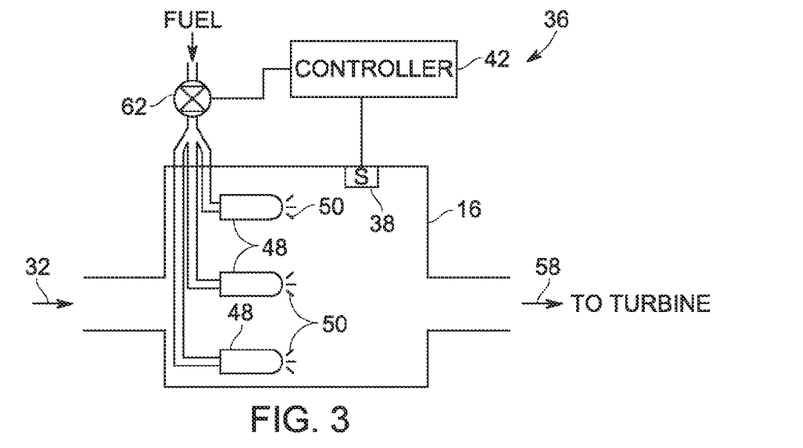
FIG. 3 is a block diagram of an alternative embodiment of a pressure oscillation reduction system that may be employed within the gas turbine engine system of FIG. 1.

FIG. 3 is a block diagram of an alternative embodiment of a pressure oscillation reduction system 36 that may be employed within the gas turbine engine system of FIG. 1. In the illustrated embodiment, the combustor 16 includes multiple main fuel injectors 48, each configured to inject fuel 50 into the combustor 16. While three fuel injectors 48 are employed in the illustrated embodiment, it should be appreciated that alternative combustors 16 may include more or fewer fuel injectors (e.g., 1, 2, 3, 4, 5, 8, 10, 12, 16, or more). As illustrated, each fuel injector 48 is fluidly coupled to a throttle valve 62, which controls fuel flow to the combustor 16. Similar to the embodiment described above with reference to FIG. 2, the controller 42 is communicatively coupled to the throttle valve 62 and the pressure sensor 38. If the pressure sensor 38 detects pressure oscillations having a magnitude greater than or equal to the threshold value, the controller 42 may cycle the valve at a frequency and a duty cycle configured to reduce pressure oscillations within the combustor 16. Because a single valve 62 is employed to control fuel flow to the fuel injectors 48, a substantially even fuel distribution may be provided throughout the combustor 16.

Figure 4:
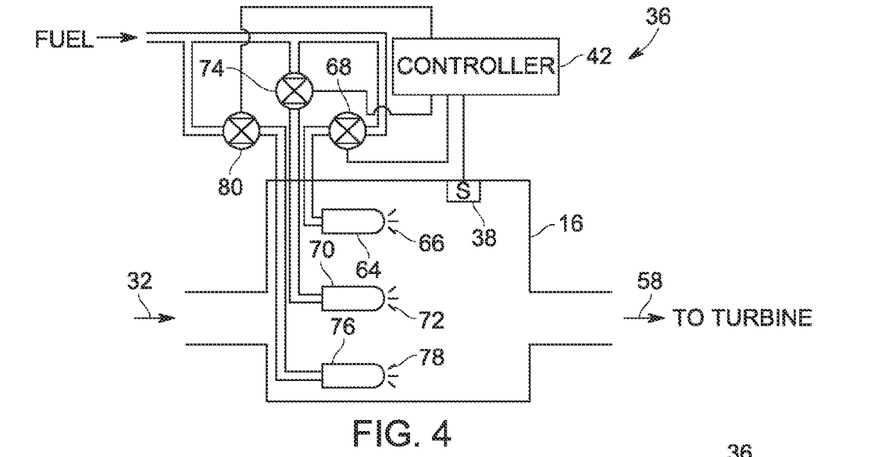
FIG. 4 is a block diagram of a further embodiment of a pressure oscillation reduction system that may be employed within the gas turbine engine system of FIG. 1.

FIG. 4 is a block diagram of a further embodiment of a pressure oscillation reduction system 36 that may be employed within the gas turbine engine system of FIG. 1. In the illustrated embodiment, the combustor 16 includes a first fuel injector 64 configured to spray fuel 66 into the combustor 16. A first valve 68 is fluidly coupled to the first fuel injector 64, and configured to control fuel flow to the first fuel injector 64. In addition, the combustor 16 includes a second fuel injector 70 configured to spray fuel 72 into the combustor 16. A second valve 74 is fluidly coupled to the second fuel injector 70, and configured to control fuel flow to the second fuel injector 70. Furthermore, the combustor 16 includes a third fuel injector 76 configured to spray fuel 78 into the combustor 16. A third valve 80 is fluidly coupled to the third fuel injector 76, and configured to control fuel flow to the third fuel injector 76. While the illustrated embodiment includes three fuel injectors and three valves, it should be appreciated that alternative embodiments may include more or fewer fuel injectors and a corresponding number of valves. For example, certain embodiments may include 1, 2, 3, 4, 5, 6, or more fuel injectors and valves.

Because fuel flow to each fuel injector is controlled by a respective valve, the controller 42 may adjust fuel flow to different regions of the combustor 16 by cycling each valve at a different frequency and/or duty cycle. However, if the pressure sensor 38 detects pressure oscillations having a magnitude greater than or equal to the threshold value, the controller 42 may cycle the valves at a frequency and a duty cycle configured to reduce pressure oscillations within the combustor 16. In certain embodiments, the controller 42 may send substantially the same signal to each valve when large magnitude pressure oscillations are detected. As previously discussed, the frequency, duty cycle, and/or phase delay of the signals may be particularly selected to reduce the magnitude of the pressure oscillations within the combustor 16. In further embodiments, the controller 42 may be configured to send different signals to certain valves. Each signal may have a different frequency, duty cycle, and/or phase delay. In such embodiments, various fuel pressure frequencies may be established throughout the combustor 16, thereby further uncoupling the heat of release pressure oscillations from the combustor pressure oscillations. As a result, the magnitude of the pressure oscillations may be further reduced.

Figure 5:
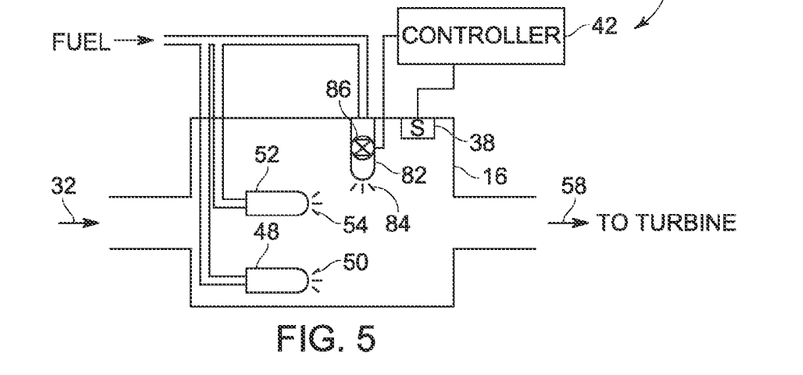
FIG. 5 is a block diagram of another embodiment of a pressure oscillation reduction system that may be employed within the gas turbine engine system of FIG. 1.

FIG. 5 is a block diagram of another embodiment of a pressure oscillation reduction system 36 that may be employed within the gas turbine engine system of FIG. 1. Similar to the embodiment described above with referenced to FIG. 2, the combustor 16 includes a main fuel injector 48 and a pilot fuel injector 52. In addition, the combustor 16 includes an auxiliary fuel injector 82 configured to provide additional fuel 84 into the combustor 16. For example, in certain embodiments, the auxiliary fuel injector 82 may be configured to provide 1 percent, 2 percent, 3 percent, 4 percent, or more, of the fuel supplied to the combustor 16. As illustrated, the auxiliary fuel injector 82 includes an integrated valve 86 configured to control fuel flow into the combustor 16. In certain embodiments, the auxiliary fuel injector 82 may be a commodity fuel injector, such as a fuel injector for an automotive reciprocating engine. In addition, while the valve 86 is integrated within the fuel injector 82, it should be appreciated that alternative embodiments may employ an auxiliary fuel injector having an external valve.

Similar to the valves described above, the valve 86 facilitates fuel flow into the combustor 16 while the valve is in an open position, and blocks fuel flow into the combustor 16 while the valve is in a closed position. During normal operation, the controller 42 may cycle the valve between the open and closed positions at a frequency and duty cycle configured to provide a desired fuel flow into the combustor 16. However, if the pressure sensor 38 detects pressure oscillations having a magnitude greater than or equal to the threshold value, the controller 42 may cycle the valve 86 at a frequency and a duty cycle configured to reduce pressure oscillations within the combustor 16.

Figure 6:
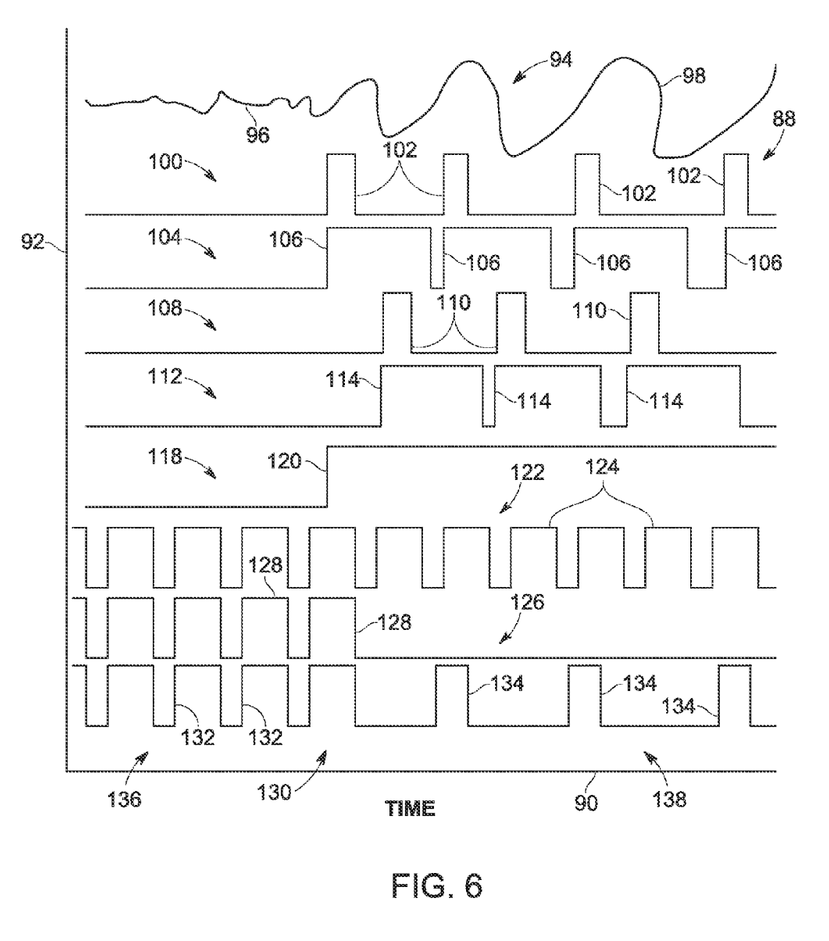
FIG. 6 is an exemplary graph of pressure oscillations within a combustor, and resultant signals from an embodiment of a pressure oscillation reduction system.

FIG. 6 is an exemplary graph 88 of pressure oscillations within a combustor, and resultant signals from an embodiment of a pressure oscillation reduction system. The graph 88 includes an x-axis 90 representative of time, and a y-axis 92 representative of pressure/signal magnitude. The graph 88 also includes a first curve 94 representative of combustor pressure (e.g., as measured by the sensor 38) as a function of time. As illustrated, the pressure curve 94 includes a first portion 96 having relatively low magnitude pressure oscillations, and a second portion 98 having relatively high magnitude pressure oscillations.

If the magnitude of the pressure oscillations exceed a threshold value, the pressure oscillation reduction system may adjust fuel flow to the combustor to substantially reduce the magnitude of the pressure oscillations. In the illustrated embodiment, the pressure oscillation reduction system is configured to generate a trigger signal 100 based on the pressure oscillations within the combustor. For example, each time the pressure within the combustor exceeds a threshold value, the pressure oscillation reduction system generates a pulse 102. Accordingly, the frequency of the trigger signal 100 may be substantially equal to the frequency of the pressure oscillations within the combustor. As discussed in detail below, the duty cycle and the phase of the trigger signal may be particularly selected to reduce the magnitude of the combustor pressure oscillations.

In addition, the pressure oscillation reduction system is configured to generate an inhibitor signal 104 having a frequency substantially equal to the frequency of the trigger signal 100. Accordingly, the start of each pulse 106 of the inhibitor signal 104 substantially aligns with the start of each pulse 102 of the trigger signal 100. However, in the illustrated embodiment, a duty cycle of the inhibitor signal 104 is greater than the duty cycle of the trigger signal. As discussed in detail below, the inhibitor signal is configured to block a steady state control signal to a valve that injects fuel into the combustor.

The pressure oscillation reduction system is also configured to generate a delayed trigger signal 108 by applying a phase delay to the trigger signal 100. As illustrated, each pulse 110 of the delayed trigger signal 108 is temporally offset from a corresponding pulse 102 of the trigger signal. Based on the delayed trigger signal 108, the pressure oscillation reduction system is configured to generate a delayed inhibitor signal 112. As illustrated, the start of each pulse 114 of the delayed inhibitor signal 112 substantially aligns with the start of each pulse 110 of the delayed trigger signal 108. However, in the illustrated embodiment, a duty cycle of the delayed inhibitor signal is greater than the duty cycle of the delayed trigger signal. The pressure oscillation reduction system is configured to add the inhibitor signal 104 to the delayed inhibitor signal 112 to generate a combined inhibitor signal 118. As illustrated, the combined inhibitor signal includes a single pulse 120 that starts at substantially the same time as the first trigger pulse 102. Accordingly, the pulse 120 starts when the magnitude of the pressure oscillations exceeds the threshold value, and continues until the magnitude of the pressure oscillations decreases below the threshold value.

As previously discussed, a valve is configured to cycle between an open position and a closed position to provide fuel to the combustor in a series of pulses. Accordingly, the pressure oscillation reduction system is configured to generate a steady state control signal 122 that includes a series of pulses 124 corresponding to fuel pulses into the combustor. As will be appreciated, the duty cycle of each pulse may be particularly adjusted to provide a desired average fuel flow rate to the combustor. However, upon detection of pressure oscillations having a magnitude greater than or equal to the threshold value, the pressure oscillation reduction system may adjust the fuel pulses to reduce the magnitude of the pressure oscillations.

In the illustrated embodiment, the pressure oscillation reduction system is configured to generate an inhibited steady state control signal 126 by subtracting the combined inhibitor signal 118 from the steady state control signal 122. As a result, prior to the start of the first pulse 102 of the trigger signal 100, the inhibited steady state control signal 126 includes pulses 128 that substantially correspond to the pulses 124 of the steady state control signal 122. However, the pulses 128 terminate upon detection of pressure oscillations having a magnitude greater than or equal to the threshold value. Furthermore, the inhibited steady state control signal 126 is added to the trigger signal 100 to establish a combined control signal 130. As illustrated, while the pressure oscillations remain below the threshold value, the combined control signal 130 includes pulses 132 that substantially correspond to the pulses 124 of the steady state control signal 122. However, after detection of pressure oscillations having a magnitude greater than or equal to the threshold value, the combined control signal 130 includes pulses 134 that substantially correspond to the pulses 102 of the trigger signal 100.

The pressure oscillation reduction system is configured to send the combined control signal to a valve that provides fuel to the combustor. Accordingly, while a magnitude of the pressure oscillations within the combustor is less than a threshold value, the pressure oscillation reduction system sends a first signal 136 to the valve that instructs the valve to cycle between the open and closed positions at a frequency and a duty cycle that provides a desired fuel flow to the combustor. However, upon detection of pressure oscillations having a magnitude greater than or equal to the threshold value, the pressure oscillation reduction system sends a second signal 138 to the valve that instructs the valve to cycle between the open and closed positions at a frequency and a duty cycle that reduces the magnitude of the pressure oscillations.

The pulses 134 of the combined control signal 130 are configured to cycle the valve at a frequency substantially equal to the frequency of the pressure oscillations. However, it should be appreciated that the frequency of the trigger pulses 102, and the resultant control signal pulses 134, may be particularly selected and/or adjusted to be greater than or less than the frequency of the pressure oscillations. In addition, the phase of the second signal 138 may be delayed relative to the phase of the pressure oscillations. Accordingly, the heat of release pressure oscillations (e.g., resulting from the control signal pulses 134) may be uncoupled from the combustor pressure oscillations. As a result, the magnitude of the pressure oscillations within the gas turbine system may be reduced, thereby increasing the efficiency and/or longevity of the system.

As previously discussed, the combined inhibitor signal 118 is generated by adding the delayed inhibitor signal 112 to the inhibitor signal 104. Accordingly, a substantially continuous pulse 120 is established when the magnitude of the pressure oscillations exceeds the threshold value. The substantially continuous pulse 120 blocks the steady state control signal 122 while the magnitude of the pressure oscillations is greater than the threshold vale. As a result, the possibility of misfiring (e.g., generating an undesired fuel pulse) and/or blending (e.g., undesirably extending the duty cycle of a fuel pulse) is substantially reduced or eliminated, thereby further reducing the magnitude of the pressure oscillations within the turbine system.

Figure 7:
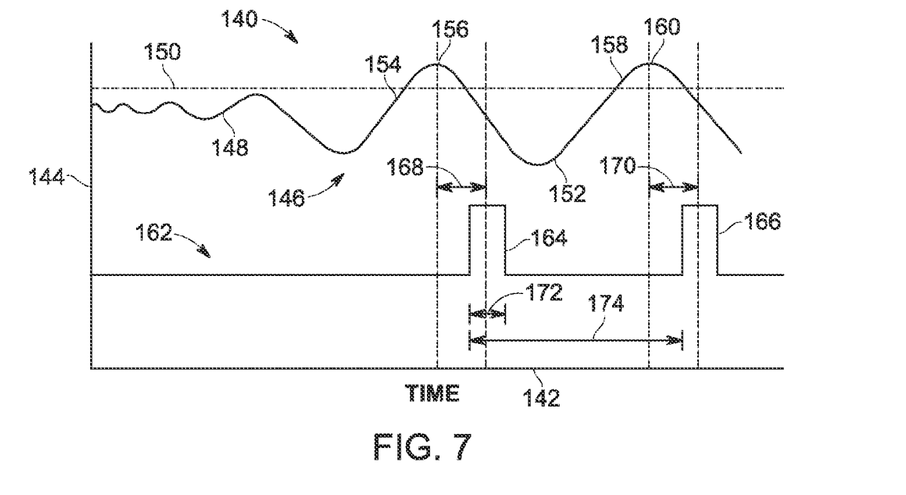
FIG. 7 is an exemplary graph of pressure oscillations within a combustor, and a resultant trigger signal from another embodiment of a pressure oscillation reduction system.

FIG. 7 is an exemplary graph 140 of pressure oscillations within a combustor, and a resultant trigger signal from an embodiment of a pressure oscillation reduction system. The graph 140 includes an x-axis 142 representative of time, and a y-axis 144 representative of pressure/signal magnitude. The graph 140 also includes a first curve 146 representative of combustor pressure as a function of time. As illustrated, the pressure curve 146 includes a first portion 148, in which a magnitude of the pressure oscillations is less than a threshold value 150. The pressure curve 146 also includes a second portion 152, in which a magnitude of the pressure oscillations is greater than the threshold value 150. Specifically, the second portion 152 of the pressure curve 146 includes a first oscillation 154 having a peak magnitude 156 that exceeds the threshold value 150. In addition, the second portion 152 of the pressure curve 146 includes a second oscillation 158 having a peak magnitude 160 that exceeds the threshold value 150.

In the illustrated embodiment, the pressure oscillation reduction system is configured to generate a trigger signal 162 based on the pressure oscillations within the combustor. Each time the magnitude of the pressure oscillations within the combustor exceeds a threshold value, the pressure oscillation reduction system generates a pulse in the trigger signal 162. As illustrated, a first pulse 164 is generated in response to the first pressure oscillation 154, and a second pulse 166 is generated in response to the second pressure oscillation 158. Accordingly, the frequency of the trigger signal 162 may be substantially equal to the frequency of the pressure oscillations within the combustor. In addition, the duty cycle and the phase of the trigger signal may be particularly selected to reduce the magnitude of the combustor pressure oscillations.

In the illustrated embodiment, the phase of the trigger signal 162 is delayed relative to the phase of the pressure oscillations. As illustrated, a peak (e.g., center point) of the first pulse 164 of the trigger signal 162 is temporally delayed by a delay time 168 relative to the peak 156 of the first pressure oscillation 154. In addition, a peak (e.g., center point) of the second pulse 166 of the trigger signal 162 is temporally delayed by a delay time 170 relative to the peak 160 of the second pressure oscillation 158. As will be appreciated, phase delay may be measured in terms of degrees between peaks, in which one cycle is equal to 360 degrees. In certain embodiments, the phase delay of the trigger pulses may be about 0 degrees to about 360 degrees, about 90 degrees to about 350 degrees, about 180 degrees to about 340 degrees, about 270 degrees to about 330 degrees, or about 320 degrees. As previously discussed, the phase delay may uncouple the heat of release pressure oscillations from the combustor pressure oscillations, thereby reducing the magnitude of the pressure oscillations within the gas turbine system.

Furthermore, the duty cycle of the trigger signal may be particularly selected and/or adjusted to substantially reduce pressure oscillations within the combustor. As will be appreciated, duty cycle may be defined as pulse width 174 divided by wavelength 172, expressed in terms of a percentage. For example, the duty cycle of the trigger signal 162 may be about 5 percent to about 50 percent, about 10 percent to about 40 percent, or about 15 percent to about 25 percent. By way of further example, the duty cycle of the trigger signal 162 may be about 11 percent, about 20 percent, about 28 percent, or about 36 percent.

Figure 8:
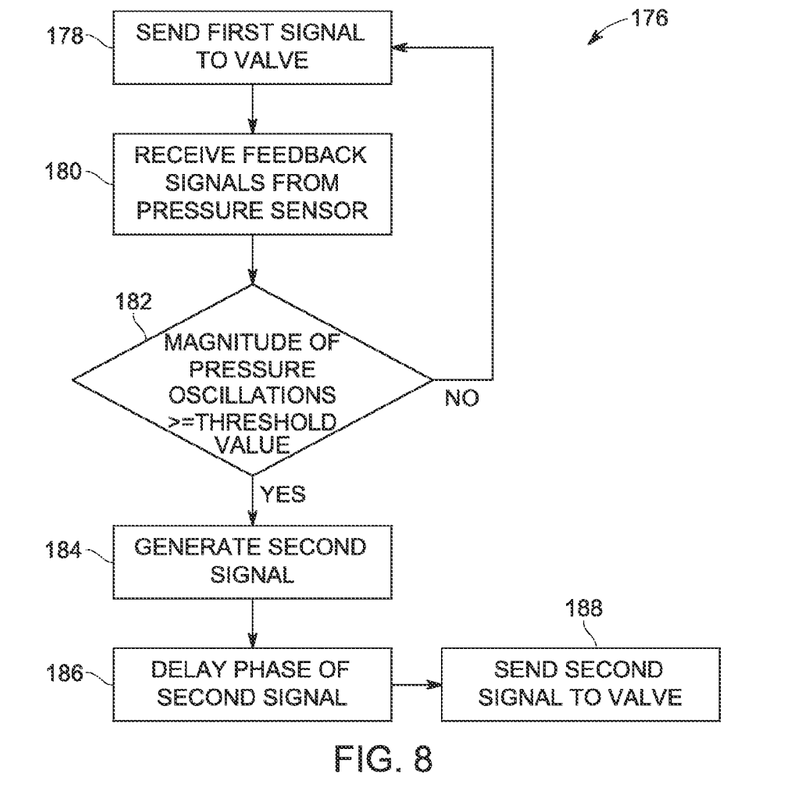
FIG. 8 is a flow diagram of an embodiment of a method for reducing pressure oscillations within a gas turbine engine.

FIG. 8 is a flow diagram of an embodiment of a method 176 for reducing pressure oscillations within a gas turbine engine. First, as represented by block 178, a first signal is sent to a valve that instructs the valve to cycle between an open position and a closed position at a first frequency and a first duty cycle. As previously discussed, the valve is configured to facilitate fuel flow to a combustor while the valve is in an open position, and to block fuel flow to the combustor while the valve is in the closed position. For example, the valve may be configured to provide fuel to a main fuel injector, a pilot fuel injector, and/or an auxiliary fuel injector. Next, as represented by block 180, a feedback signal is received from a pressure sensor. The feedback signal may include a magnitude, a phase, and/or a frequency of pressure oscillations within the combustor.

As represented by block 182, a magnitude of the pressure oscillations within the combustor is compared to a threshold value. If the magnitude of the pressure oscillations is less than the threshold value, the first signal continues to be sent to the valve. Otherwise, as represented by block 184, a second signal is generated. As discussed in detail below, the second signal is configured to instruct the valve to cycle between the open position and the closed position at a second frequency and a second duty cycle. The second frequency is substantially equal to the frequency of the pressure oscillations within the combustor. In certain embodiments, a phase of the second signal is delayed relative to the phase of the pressure oscillations, as represented by block 186. As previously discussed, the phase delay may uncouple the heat of release pressure oscillations from the combustor pressure oscillations, thereby reducing the magnitude of the pressure oscillations within the gas turbine system. Once the second signal is established, the second signal is sent to the valve, as represented by block 188.

Figure 9:
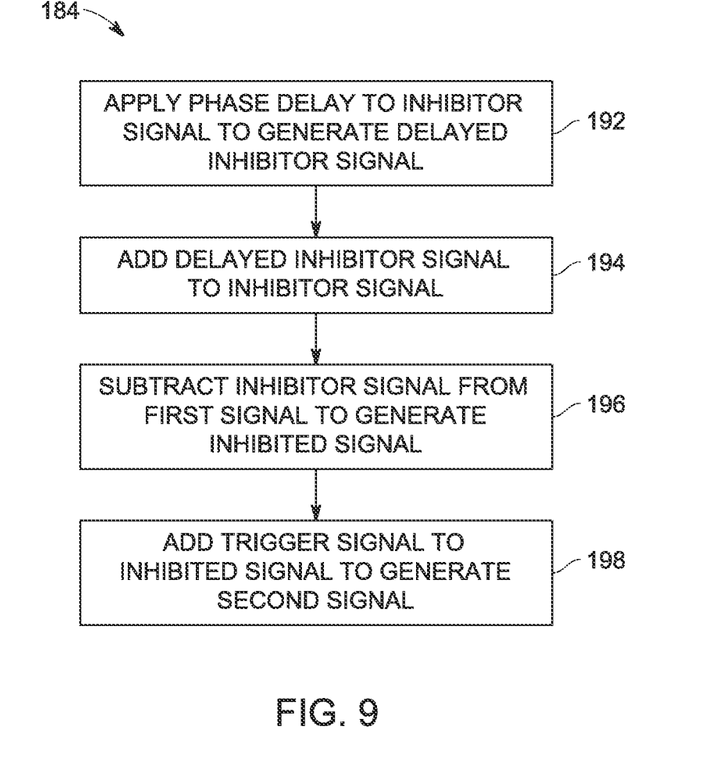
FIG. 9 is a flow diagram of an embodiment of a method for generating a valve control signal.

FIG. 9 is a flow diagram of an embodiment of a method 184 for generating a valve control signal. First, as represented by block 192, a delayed inhibitor signal is generated by applying a phase delay to an inhibitor signal. As previously discussed, the inhibitor signal is generated by extending the duty cycle of a trigger signal. The delayed inhibitor signal is then added to the inhibitor signal, as represented by block 194. Next, as represented by block 196, the inhibitor signal is subtracted from the first signal to generate an inhibited signal. The trigger signal is then added to the inhibited signal to generate the second signal, as represented by block 198. As previously discussed, adding the delayed inhibitor signal to the inhibitor signal substantially reduces or eliminates the possibility of misfiring (e.g., generating an undesired fuel pulse) and/or blending (e.g., undesirably extending the duty cycle of a fuel pulse), thereby further reducing the magnitude of the pressure oscillations within the turbine system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system for reducing pressure oscillations within a gas turbine engine, comprising:
   at least one fuel injector configured to inject fuel into a combustor;
   a valve fluidly coupled to the at least one fuel injector, wherein the valve is configured to facilitate fuel flow to the at least one fuel injector while the valve is in an open position, and to block fuel flow to the at least one fuel injector while the valve is in a closed position; and
   a controller communicatively coupled to the valve, wherein the controller is configured:
   to send a first control signal instructing the valve to cycle between the open position and the closed position, the first control signal having a first frequency and a first duty cycle while a magnitude of pressure oscillations within the combustor is less than a threshold value,
   to receive a feedback signal indicative of a magnitude, a phase, and a frequency of pressure oscillations within the combustor;
   to send a second control signal instructing the valve to cycle between the open position and the closed position, the second control signal having a second frequency and a second duty cycle while the magnitude of the pressure oscillations within the combustor is greater than or equal to the threshold value,
   wherein to send a second control signal comprises:
   to generate an inhibitor signal that blocks at least a portion of the first control signal,
   to generate an inhibited signal by subtracting the inhibitor signal from the first signal,
   to add a trigger signal to the inhibited signal to generate the second control signal,
   wherein a frequency of the trigger signal is substantially equal to the second frequency, a duty cycle of the trigger signal is substantially equal to the second duty cycle, a frequency of the inhibitor signal is substantially equal to the second frequency, and a duty cycle of the inhibitor signal is greater than the second duty cycle, and
   to adjust the second frequency associated with the second control signal based on the frequency of the pressure oscillations such that the second frequency associated with the second control signal is substantially equal to the frequency of the pressure oscillations within the combustor.

2. The system of claim 1, wherein the at least one fuel injector comprises a plurality of fuel injectors each configured to inject fuel into the combustor, and the valve comprises a throttle valve fluidly coupled to the plurality of fuel injectors.

3. The system of claim 1, wherein the at least one fuel injector comprises an auxiliary fuel injector, and the valve is integrated within the auxiliary fuel injector.

4. The system of claim 1, wherein the at least one fuel injector is configured to inject fuel into the combustor to establish a pilot flame.

5. The system of claim 1, wherein the controller is configured to delay the second control signal instructing the valve between the open position and the closed position by a phase delay relative to a phase of the pressure oscillations.

6. The system of claim 5, wherein the phase delay is about 270 degrees to about 330 degrees.

7. The system of claim 1, wherein the second duty cycle is about 10 percent to about 40 percent.

8. The system of claim 1, comprising a pressure sensor communicatively coupled to the controller, and configured to output the feedback signal indicative of a magnitude, a phase, and a frequency of pressure oscillations within the combustor.

9. A system for reducing pressure oscillations within a gas turbine engine, comprising:
   a controller configured:
   to send a first signal to at least one valve that instructs the at least one valve to cycle between an open position that facilitates fuel flow to a combustor and a closed position that blocks fuel flow to the combustor, the first signal having a first frequency and a first duty cycle,
   to receive feedback signals indicative of a magnitude, a phase, and a frequency of pressure oscillations within the combustor, and
   to send the second signal to the at least one valve that instructs the at least one valve to cycle between the open position and the closed position, the second signal having a second frequency and a second duty cycle while the magnitude of the pressure oscillations within the combustor is greater than or equal to a threshold value,
   wherein to send the second signal comprises:
   to generate an inhibitor signal that blocks at least a portion of the first control signal,
   to generate an inhibited signal by subtracting the inhibitor signal from the first signal, to add a trigger signal to the inhibited signal to generate a second signal,
wherein a frequency of the trigger signal is substantially equal to the second frequency, a duty cycle of the trigger signal is substantially equal to the second duty cycle, a frequency of the inhibitor signal is substantially equal to the second frequency, and a duty cycle of the inhibitor signal is greater than the second duty cycle,
wherein the controller is configured to adjust the second frequency associated with the second signal such that the second frequency associated with the second signal is substantially equal to the frequency of the pressure oscillations within the combustor.

10. The system of claim 9, wherein the at least one valve comprises a plurality of valves, each valve is fluidly coupled to a respective fuel injector, each fuel injector is configured to inject fuel into the combustor, and the controller is configured to send a respective first signal and a respective second signal to each valve.

11. The system of claim 9, wherein the controller is configured to delay a phase of the second signal relative to the phase of the pressure oscillations.

12. The system of claim 9, comprising a main fuel injector, and a pilot fuel injector, wherein the at least one valve is fluidly coupled to the main fuel injector, the pilot fuel injector, or a combination thereof.

13. The system of claim 9, comprising a main fuel injector, a pilot fuel injector, and an auxiliary fuel injector, wherein the at least one valve is fluidly coupled to the auxiliary fuel injector.

14. A method for reducing pressure oscillations within a gas turbine engine, comprising:
sending a first signal to a valve that instructs the valve to cycle between an open position and a closed position, the first signal having a first frequency and a first duty cycle, wherein the valve is configured to facilitate fuel flow to a combustor while the valve is in the open position, and to block fuel flow to the combustor while the valve is in the closed position;
receiving feedback signals from a pressure sensor indicative of a magnitude, a phase, and a frequency of pressure oscillations within the combustor; and
sending a second signal to the valve that instructs the valve to cycle between the open position and the closed position, the second signal having a second frequency and a second duty cycle while the magnitude of the pressure oscillations within the combustor is greater than or equal to a threshold value, wherein the second frequency is substantially equal to the frequency of the pressure oscillations within the combustor,
wherein sending a second signal comprises:
generating the second signal by subtracting an inhibitor signal from the first signal to generate an inhibited signal,
adding a trigger signal to the inhibited signal to generate the second signal,
wherein a frequency of the trigger signal is substantially equal to the second frequency, a duty cycle of the trigger signal is substantially equal to the second duty cycle, a frequency of the inhibitor signal is substantially equal to the second frequency, and a duty cycle of the inhibitor signal is greater than the second duty cycle.

15. The method of claim 14, wherein generating the second signal comprises generating a delayed inhibitor signal by applying a phase delay to the inhibitor signal, and adding the delayed inhibitor signal to the inhibitor signal prior to subtracting the inhibitor signal from the first signal.

16. The method of claim 14, comprising delaying a phase of the second signal relative to the phase of the pressure oscillations prior to sending the second signal to the valve.

17. The method of claim 14, wherein the second duty cycle is about 10 percent to about 40 percent.

* * * * *